Patented Jan. 16, 1923.

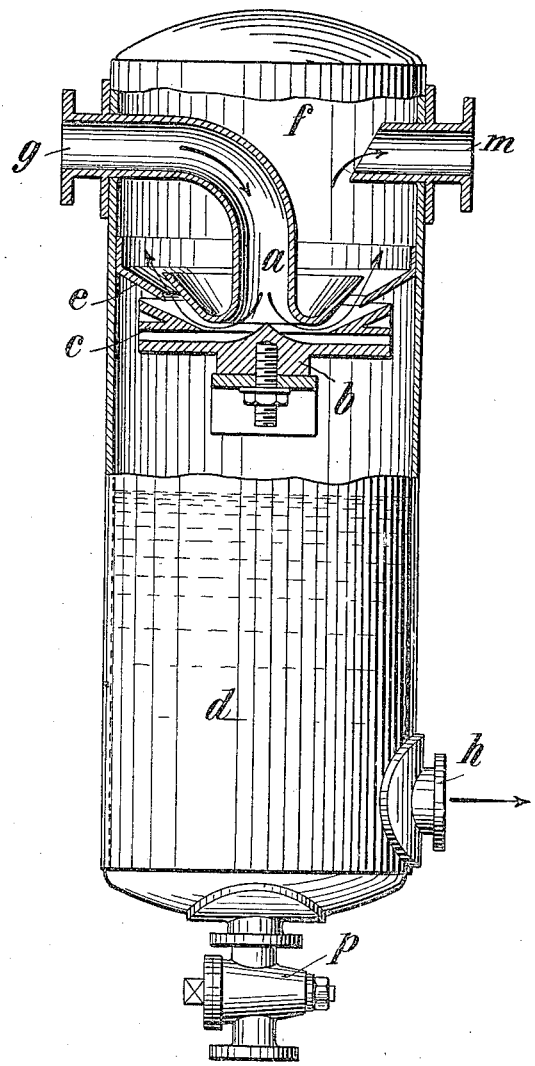

1,442,689

UNITED STATES PATENT OFFICE.

OSKAR LOSS, OF BERLIN-CHARLOTTENBURG, GERMANY, ASSIGNOR TO DAVID GROVE AKTIEN-GESELLSCHAFT, OF BERLIN-CHARLOTTENBURG, GERMANY.

SEPARATING APPARATUS FOR STEAM, COMPRESSED AIR, AND GASES OF ALL KINDS.

Application filed August 25, 1921. Serial No. 495,224.

*To all whom it may concern:*

Be it known that I, OSKAR LOSS, a citizen of the Republic of Germany, residing at Berlin-Charlottenburg, Germany, have invented certain new and useful Improvements in Separating Apparatus for Steam, Compressed Air, and Gases of All Kinds (for which I have filed an application in Germany, filed March 11, 1920); and I do hereby declare the following to be a full, clear, and exact description of the invention.

The present invention has for object an apparatus for separating solid and liquid substances from steam, compressed air and all kinds of gases, and in particular for separating from a jet of steam water, mud, granular dust and other specifically heavy bodies.

The present device contrasts from known similar apparatus in that the steam entering the separator casing in the form of a full cylindrical or rectangular jet is spread out in an annular or rectangular nozzle in the form of a mantle, and in that the said mantle of steam in an enlargement of said nozzle encounters one or several edge-like superposed or juxtaposed separating bodies, arranged within said nozzle.

The first separating body or member met by the jet of steam, divides the nozzle enlarged towards the rear or sideways into a nozzle running in the direction of the flow of steam, for discharging the water and mud, and in a second enlarged and surrounding steam nozzle, into which latter an edge-like separating member projects from the wall of the casing in such a manner, that a second nozzle, an upper water and mud discharge nozzle running alongside with the steam nozzle, and a third nozzle, a steam inlet nozzle leading to the steam accumulating chamber, are formed.

A peculiar characteristic feature of the nozzles for discharging the water and mud is a certain length thereof and their continuously equal or approximately equal direction or their horizontal or little inclined position.

A new effect is attained by this in so far as the speed of flow of the steam at the edges of the separating members in respect of the steam contained in the nozzles serving for removing the water, is converted into pressure. If, the steam is thus flowing in the same direction upon the steam contained therein, the latter is compressed and in consequence the suction action upon the water, perhaps rising in the lower water collecting portion close below the lower nozzle for discharging the water and mud, is prevented.

Any eddies of the steam at the edges of the separating members promoting such suction, are prevented in consequence of the length of the nozzles for discharging the water.

In the drawings such steam separator is illustrated by way of example, partly in section and partly in side view and it is supposed that the steam inlet pipe is of cylindrical shape. The steam entering through the nozzle $g$, and from which water, mud and granular dust is to be separated, flows in the shape of a full cylindrical jet through an inlet pipe $a$, having a trumpet-like bent-up edge, to a steam purifier where it meets the surface of a deflecting cone $b$ having concave faces, which extend straight laterally or in a horizontal or slightly inclined direction. Between the lower bent-up edge of the inlet-pipe $a$ and the conical deflecting face $b$ of the steam nozzle flaring outwards, the edge-like separating members $c$ and above the partition $e$ extending edge-like from the wall of the casing, are formed.

The separating elements divide the separator vessel into an upper chamber $f$ for the cleansed steam or gas, and a lower chamber $d$ for the separated water and sludge.

The full jet of steam is spread out like a mantle in the annular nozzle extending laterally and all specifically heavy substances carried along by the steam are thrown by centrifugal force upon the deflecting surface $b$ and led into the laterally extending annular nozzle for the discharge of the water and mud, which is formed by the lower annular surface of the first separating member $c$ and the opposite deflecting surface $b$. Said nozzle is of a certain length, so that as mentioned above, the steam is compressed therein. The solid and liquid substances separated in this nozzle are then accumulating in the lower chamber $d$ of the separator.

At the edge of the first separating member $c$ the flow of steam is simultaneously deflected in an upward direction whereby again the water and mud particles thrown against the upper face of said member, are forced into the upper discharge nozzle for the water and mud, which is formed by the upper wall $c$ and the lower wall of the edge-like separating member *e* extending from the wall of the casing. The solid and liquid substances separated at this point are likewise led into the lower chamber *d* of the separator.

The flange-like ring *e* not only effects the final separation, but also prevents any splash from the sides of the vessel from entering the upper chamber *f* for the purified fluid.

Through pipe *h* the water flows from the chamber *d* to the steam water discharge, whilst the mud can be removed through a lower blow-off cock *p*.

The steam thus freed from water and solid substances enters through the slit, formed by the bent-up edge of the pipe *a* and the separating member *c*, the upper chamber *f* of the separator, from whence it passes through the nozzle *m*.

Instead of constructing the steam inlet pipe *a* cylindrically as shown, such pipe may also be of rectangular cross section. The deflecting faces *b* and the separating bodies *c* and *e* must in such case be adapted to the flat cross-section of the pipe *a*. The conical deflecting surface *b* may be formed into a flat plate of rectangular shape, having in its center a rib of the cross-section shown in the drawing. The separating members *c* and *e* are correspondingly shaped.

I claim:

1. A separator for steam and other fluids comprising an inlet pipe having a flared flange turned backwardly, a deflecting cone at the mouth of said pipe having a substantially straight discharge surface tangent to the path of deflection, a separating member having a separating edge included between said tangential discharge and said flared, backwardly turned edge, whereby the heavier particles are directed radially and the steam or other gas is deviated by said edge in a different direction.

2. A separator for steam and other fluids, comprising a vessel, separating means therein dividing said vessel into an upper and a lower chamber, said separating means comprising a pipe having a flared outwardly and rearwardly bent flange substantially in the axis of said vessel, a deflecting cone opposite the mouth of said pipe and opposite said flange and having a horizontal discharge surface tangent to the path of the moving fluid from said cone, and a wedge-shaped separating member between the cone and flange to upwardly direct the purified fluid.

3. A separator for steam and other fluids, comprising an inlet pipe terminating in a flared, backwardly turned flange, a deflecting cone opposite said end flange terminating in a flat discharge surface tangent to the path of deflection by said cone, a wedge-shaped separating member between said cone and flange forming two passages, and a ring dividing the passage between said member and flange into two separate passages, one below said ring and the other above it.

4. A separator for steam and other fluids, comprising a vertical vessel, separating means in said vessel dividing it into an upper and a lower chamber, said separating member comprising a curved pipe terminating centrally of said vessel and having a flared rearwardly directed flange at its end, a cone opposite the end of said pipe merging into a flat horizontal discharge surface, a wedge-shaped member between said surface and flange and spaced from both, forming a lower radial passage and an upwardly inclined passage, and a ring flange secured to said vessel and projecting into said upwardly inclined passage and dividing the same.

In testimony that I claim the foregoing as my invention I have signed my name.

OSKAR LOSS.